United States Patent
Dallinger et al.

(10) Patent No.: US 11,975,618 B2
(45) Date of Patent: May 7, 2024

(54) HIGH-VOLTAGE CHARGING ARRANGEMENT FOR AN ELECTRIC VEHICLE, AND A METHOD FOR CHARGING A TRACTION BATTERY

(71) Applicant: Dr. Ing. h.c. F. Porsche Aktiengesellschaft, Stuttgart (DE)

(72) Inventors: David Dallinger, Stuttgart (DE); Sven Toepler, Sachsenheim (DE); Leonie Weidenmann, Stuttgart (DE); Jana Schilling, Magstadt (DE); Pavithra Rao Kasargod Pattanshetty, Leonberg (DE); Wolf-Georg Rampf, Karlsruhe (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 428 days.

(21) Appl. No.: 17/336,569

(22) Filed: Jun. 2, 2021

(65) Prior Publication Data
US 2022/0032789 A1    Feb. 3, 2022

(30) Foreign Application Priority Data
Jul. 29, 2020   (DE) .................... 10 2020 119 974.0

(51) Int. Cl.
*B60L 53/10*    (2019.01)
*B60L 53/14*    (2019.01)
(Continued)

(52) U.S. Cl.
CPC ............... *B60L 53/11* (2019.02); *B60L 53/14* (2019.02); *B60L 53/24* (2019.02); *B60L 53/30* (2019.02);
(Continued)

(58) Field of Classification Search
CPC .......... B60L 53/11; B60L 53/14; B60L 53/24; B60L 53/30; B60L 53/66; B60L 2210/10;
(Continued)

(56) References Cited

U.S. PATENT DOCUMENTS

| 8,773,065 B2 | 7/2014 | Ang |
| 10,471,837 B2 | 11/2019 | Herke et al. |

(Continued)

FOREIGN PATENT DOCUMENTS

| CN | 107891775 | 4/2018 |
| CN | 108146280 | 6/2018 |

(Continued)

OTHER PUBLICATIONS

Chinese Search Report dated Aug. 29, 2023.

*Primary Examiner* — Brian P Sweeney
(74) *Attorney, Agent, or Firm* — Gerald E. Hespos; Michael J Porco

(57) ABSTRACT

A high-voltage charging arrangement (2) is provided for charging a traction battery (20) of an electric vehicle at a DC charging station (4). The DC charging station (4) has a first voltage ($V_{in}$) and the traction battery (20) has a second voltage ($V_{out}$). At least one DC-DC converter (10) has a first conduction path (12) with a converter (16) for transforming the first voltage ($V_{in}$) into the second voltage ($V_{out}$) and a second conduction path (14) has a bypass (18) for bypassing the converter (16). A control device (26) communicates with the DC charging station (4) is possible. An input element (28) is provided for selecting a conduction path (12, 14) and is connected to the control device (26) for control purposes. A method also is provided for performing a charging process for a traction battery (20) of an electric vehicle at a DC charging station (4).

7 Claims, 2 Drawing Sheets

(51) Int. Cl.
*B60L 53/24* (2019.01)
*B60L 53/30* (2019.01)
*B60L 53/66* (2019.01)
*H02J 7/00* (2006.01)

(52) U.S. Cl.
CPC .............. *B60L 53/66* (2019.02); *H02J 7/007* (2013.01); *B60L 2210/10* (2013.01); *B60Y 2200/91* (2013.01)

(58) Field of Classification Search
CPC ......... B60L 2240/527; B60L 2240/547; B60L 53/22; B60L 53/60; H02J 7/007; H02J 2207/20; B60Y 2200/91; Y02T 10/70; Y02T 10/7072; Y02T 10/72; Y02T 10/92; Y02T 90/14; Y02T 90/16; Y02T 90/12
See application file for complete search history.

(56) References Cited

U.S. PATENT DOCUMENTS

| 11,097,626 | B2 | 8/2021 | Pfeilschifter et al. |
| 2005/0090946 | A1 | 4/2005 | Pickering et al. |
| 2010/0097031 | A1* | 4/2010 | King ................ B60L 53/14 320/109 |
| 2013/0175974 | A1 | 7/2013 | Bassham et al. |
| 2014/0347018 | A1 | 11/2014 | Boblett et al. |
| 2016/0214493 | A1* | 7/2016 | Herke ............... B60L 53/665 |
| 2016/0264126 | A1 | 9/2016 | Ketfi-Cherif et al. |

FOREIGN PATENT DOCUMENTS

| DE | 102020004780 A1 * | 11/2020 | ............ B60L 58/10 |
| EP | 3 587 169 | 1/2020 | |

\* cited by examiner

HIGH-VOLTAGE CHARGING ARRANGEMENT FOR AN ELECTRIC VEHICLE, AND A METHOD FOR CHARGING A TRACTION BATTERY

CROSS REFERENCE TO RELATED APPLICATION

This application claims priority under 35 USC 119 to German Patent Appl. No. 10 2020 119 974.0 filed on Jul. 29, 2020, the entire disclosure of which is incorporated herein by reference.

BACKGROUND

Field of the Invention

The invention relates to a high-voltage charging arrangement for an electric vehicle for charging a traction battery at a DC charging station. The DC charging station has a first voltage and the traction battery has a second voltage. There is provision for at least one DC-DC converter having at least two conduction paths. The first conduction path has a converter for transforming the first voltage into the second voltage, and the second conduction path has a bypass for bypassing the converter. A control device is provided and enables communication with the DC charging station. The invention also relates to a method for performing a charging process for a traction battery of an electric vehicle.

Related Art

High-voltage charging arrangements for electric vehicles and methods for performing a charging process are well known and are intended to allow so-called fast charging of the traction battery at DC charging stations having as high a voltage as possible. Thus, a vehicle user is able to charge the traction battery within no more than twenty to thirty minutes such that a sufficient range is ensured. At present, there are predominantly electric vehicles whose traction battery has a voltage of less than 500 volts. DC charging stations currently can have voltages of between 200 volts and 500 volts or even between 200 volts and 1000 volts. However, voltages up to approximately 10,000 volts are entirely conceivable in the future. At present, different voltages of the DC charging station and the traction battery must be aligned to be able to charge a traction battery having a voltage of 800 V, for example, at a DC charging station having a voltage of 400 V. DE 10 2015 101 187 A1 discloses the practice of providing a DC-DC converter having at least two conduction paths in a high-voltage charging arrangement. The first conduction path has a converter and the second conduction path has a bypass for bypassing the converter. A control device of the high-voltage charging arrangement detects the voltage of the DC charging station and automatically selects the suitable conduction path. In particular if the spread of the different voltages becomes wider (up to 10,000 volts), automatic assignment of the conduction paths is increasingly flawed, which means that the charging process is no longer started correctly and therefore terminated. The vehicle user then no longer is able to charge his vehicle at the selected DC charging station.

It is an object of the invention to avoid the aforementioned disadvantage in the simplest and cheapest possible manner.

SUMMARY

This object is achieved by a high-voltage charging arrangement with an input element for selecting a conduction path. The input element is connected to the control device for control purposes. This provides the vehicle user himself with the ability to select the correct conduction path and to ensure that the charging process can be started correctly.

The input element in this case can be in the form of an app application, in the form of a physical pushbutton switch and/or in the form of an interface device. An interface device may be a touch sensitive screen or monitor on the dashboard or other location in the in the vehicle interior, whereas a physical pushbutton switch preferably is provided in direct proximity to the charging socket.

A conduction path that needs to be selected automatically by the control device can be presettable using the input element. In this case, the preset conduction path to be settable by the control device after a defined period of time has elapsed.

The invention also relates to a method for performing a charging process for a traction battery of an electric vehicle at a DC charging station using the high-voltage charging arrangement described above. The method includes a first step of checking the first voltage of the DC charging station. If the voltages of the traction battery and the DC charging station are different then a second step of the method involves using the input element to select the appropriate conduction path. A third step involves connecting the electric vehicle to the DC charging station to start a charging process. A fourth step involves exchanging information between the control device and the DC charging station and terminating the charging process in the absence of plausibility. A fifth step involves beginning the charging process, and a sixth step involves ending the charging process.

Advantageously, a conduction path can be set after a defined period of time has elapsed after the charging process has been ended.

The invention is explained more thoroughly on the basis of a drawing.

DETAILED DESCRIPTION

Figure 1:
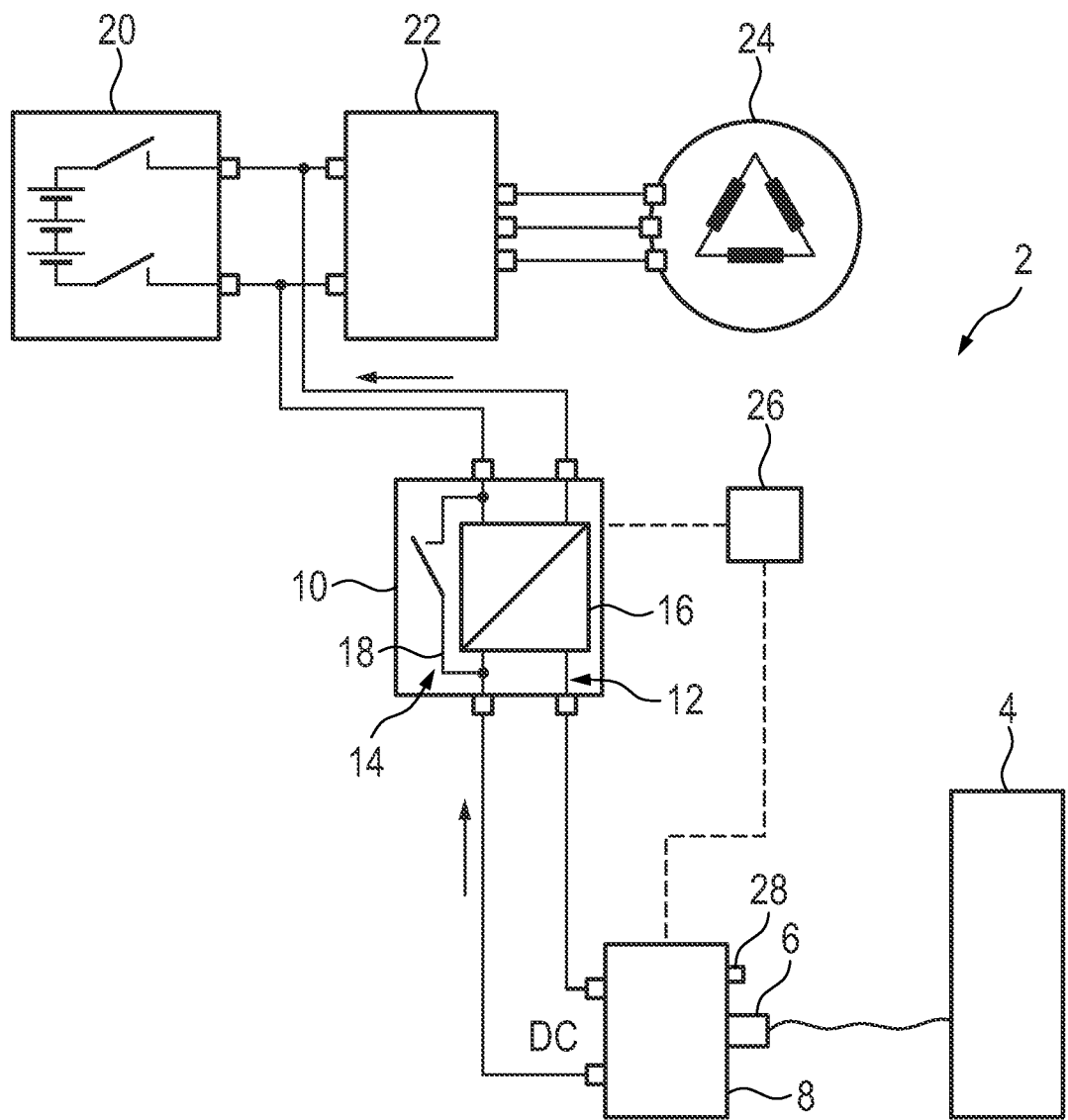
FIG. 1 is a circuit diagram for a high-voltage charging arrangement according to the invention.

FIG. 1 is a circuit diagram for a high-voltage charging arrangement 2 for an electric vehicle with a schematically depicted DC charging station 4. The DC charging station 4 in this case has a first voltage $V_{in}$, for example 400 volts. In a known manner, the DC charging station 4 is coupled electrically to a socket 8 of the electric vehicle via a connector 6. The socket 8 is connected electrically in a known manner to a DC-DC converter 10, which in turn has two conduction paths 12, 14. In a known manner, the first conduction path 12 has a converter 16 and the second conduction path 14 has a switchable bypass 18 for bypassing the converter 16. The DC-DC converter 10, in turn, is coupled electrically in a known manner to a traction battery 20 and power electronics 22, by means of which an electric motor 24 is supplied with power.

The traction battery 20 has a second voltage $V_{out}$, here 800 volts. In this embodiment. The current from the DC charging station 4 thus is routed via the first conduction path 12, with the first voltage $V_{in}$, 400 volts, being transformed into the second voltage $V_{out}$, 800 volts. A control device 26 is connected to the DC-DC converter 10 and the socket 8 for control purposes so that the high-voltage charging arrangement 2 can communicate with the DC charging station 4. The control device 26 may be a computer and accordingly comprises one or more general-purpose processors (CPUs) or microprocessors, RISC processors, GPUs and/or DSPs. The control device 26 or computer has, for example, additional elements such as storage interfaces of the communication interfaces. Optionally or additionally, the terms refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

A memory is for example a hard disk (HDD) or a (nonvolatile) solid state memory, for example a ROM store or flash memory [flash EEPROM]. The memory often comprises a plurality of individual physical units or is distributed over a multiplicity of separate devices, as a result of which access thereto takes place via data communication, for example package data service.

Figure 2:
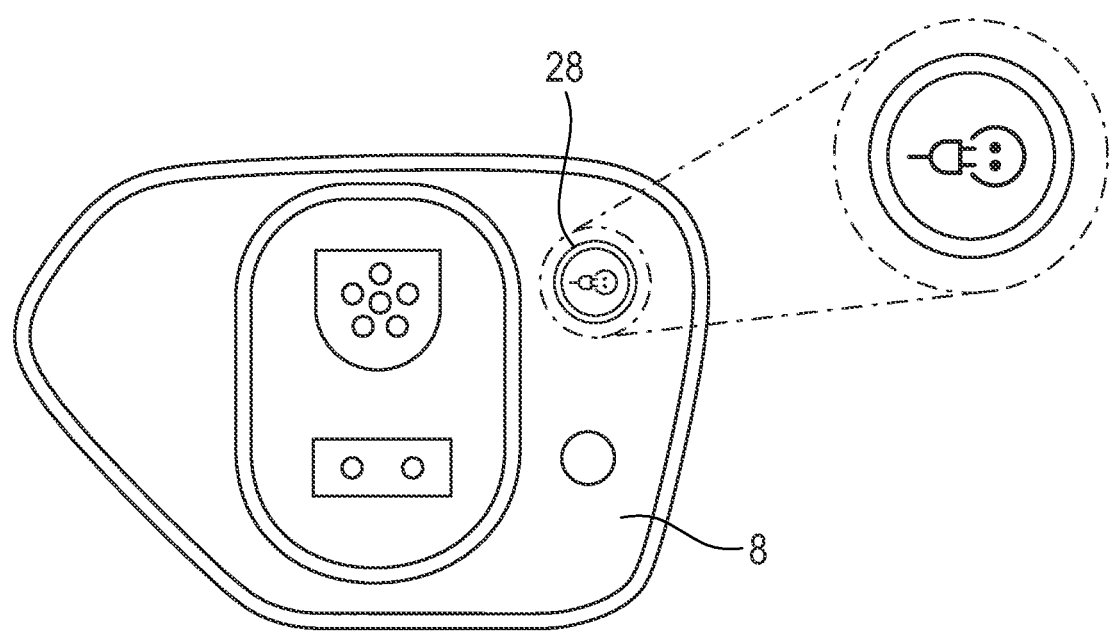
FIG. 2 is a front view of a socket of an electric car.

As depicted in more detail in FIG. 2, an input element 28 is provided in the region of the socket 8 for an input element 28 and is connected to the control device 26 for control purposes via the socket 8. The input element 28 is in the form of a physical pushbutton switch, but can additionally or alternatively be in the form of an app application or even in the form of an interface device. The input element 28 can be used easily to select the conduction path 12, 14 that needs to be selected. In the present embodiment, only two conduction paths 12, 14 are depicted. However, it should be clear that, depending on the range of the voltages to be selected, there can be more than two conduction paths. The conduction path 12, 14 that needs to be selected is presettable via the control device 26 and an interface device connected thereto. This pre-set conduction path 12, 14 is set after a defined period of time following selection of an alternative conduction path 12, 14.

FIG. 2 is a front view of the socket 8 with the physical pushbutton switch 28.

A method according to the invention for performing a charging process for the traction battery 20 of an electric vehicle at a DC charging station 4 using a high-voltage charging arrangement 2 has a first step of checking the first voltage $V_{in}$ of the DC charging station 4. If the voltages $V_{in}$, $V_{out}$ of the traction battery 20 and the DC charging station 4 are different then a second step involves using the input element 28 to select the appropriate conduction path 12, 14. A third step then involves connecting the electric vehicle to the DC charging station 4 via the connector 6 to start a charging process. At this moment, an exchange of information between the control device 26 and the DC charging station 4 takes place in a known manner. Normally, positive plausibility results in the charging process being started in a fifth step and ended in a sixth step, after which the traction battery 20 is sufficiently charged. The connector 6 then can be removed from the socket 8 again. After a certain period of time, for example 5 minutes, the preset conduction path 12, 14 is set via the control device 26.

What is claimed is:

1. A high-voltage charging arrangement for an electric vehicle for charging a traction battery at a DC charging station, wherein the DC charging station has a first voltage ($V_{in}$) and the traction battery has a second voltage ($V_{out}$), the charging arrangement comprising:
   at least one DC-DC converter having at least first and second conduction paths, the first conduction path having a converter for transforming the first voltage ($V_{in}$) into the second voltage ($V_{out}$), and the second conduction path having a bypass for bypassing the converter;
   a control device communicating with the DC charging station; and
   an input element disposed to be accessible to a vehicle user and activatable by the vehicle user for selecting-a one of the at least first and second conduction paths, the input element being connected to the control device for control purposes.

2. The high-voltage charging arrangement of claim 1, wherein the electric vehicle has a socket that is connectable to a connector of the charging station and the input element is a physical pushbutton switch adjacent to the socket.

3. The high-voltage charging arrangement of claim 1, wherein the input element is an interface device on a dashboard in an interior of the vehicle.

4. The high-voltage charging arrangement of claim 1, wherein the input element is in the form of an app application.

5. The high-voltage charging arrangement of claim 1, wherein the conduction path is presettable using the input element.

6. A high-voltage charging arrangement for charging a traction battery of an electric vehicle at a DC charging station, the DC charging station having a first voltage ($V_{in}$) and the traction battery having a second voltage ($V_{out}$), the high-voltage charging arrangement comprising:
   at least one DC-DC converter having at least first and second conduction paths, the first conduction path having a converter for transforming the first voltage ($V_{in}$) into the second voltage ($V_{out}$), and the second conduction path having a bypass for bypassing the converter;
   a control device communicating with the DC charging station; and
   an input element for selecting one of the conduction paths, the input element being connected to the control device for control purposes, wherein one of the conduction paths is presettable using the input element and is settable by the control device after a defined period of time has elapsed.

7. A method for performing a charging process for a traction battery of an electric vehicle at a DC charging station, the DC charging station having a first voltage ($V_{in}$) and the traction battery having a second voltage ($V_{out}$), the electric vehicle having a high-voltage charging arrangement that includes
   at least one DC-DC converter with at least first and second conduction paths, the first conduction path having a converter for transforming the first voltage ($V_{in}$) into the second voltage ($V_{out}$), and the second conduction path having a bypass for bypassing the converter, the charging arrangement further having a control device communicating with the DC charging station and an input element for selecting one of the conduction path, the input element being connected to the control device for control purposes, the method comprising:
   checking the first voltage ($V_{in}$) of the DC charging station;
   using the input element to select one of the conduction paths if the voltages ($V_{in}$, $V_{out}$) of the traction battery and the DC charging station are different;

connecting the electric vehicle to the DC charging station to start a charging process;
exchanging information between the control device and the DC charging station and terminating the charging process in the absence of plausibilization,
beginning the charging process;
ending the charging process and
using the control device for setting a conduction path to a preset conduction path after a defined period of time has elapsed after the charging process has been ended.

* * * * *